US006406641B1

(12) United States Patent
Golzarian

(10) Patent No.: US 6,406,641 B1
(45) Date of Patent: Jun. 18, 2002

(54) LIQUID ETCH ENDPOINT DETECTION AND PROCESS METROLOGY

(75) Inventor: Reza Golzarian, San Francisco, CA (US)

(73) Assignee: Luxtron Corporation, Santa Clara, CA (US)

( * ) Notice: Subject to any disclaimer, the term of this patent is extended or adjusted under 35 U.S.C. 154(b) by 0 days.

(21) Appl. No.: 08/877,537

(22) Filed: Jun. 17, 1997

(51) Int. Cl.$^7$ .............................................. H01L 21/302
(52) U.S. Cl. .............................. 216/85; 438/8; 438/756
(58) Field of Search ........................... 438/8, 756, 757, 438/754; 216/85

(56) References Cited

U.S. PATENT DOCUMENTS

| | | | |
|---|---|---|---|
| 3,327,584 A | 6/1967 | Kissinger ..................... | 88/14 |
| 3,905,852 A | 9/1975 | Mukai et al. ................ | 156/180 |
| 3,953,265 A * | 4/1976 | Hood .......................... | 438/747 |
| 4,289,188 A | 9/1981 | Mizutani et al. | |
| 4,317,698 A * | 3/1982 | Christol et al. ............. | 156/626 |
| 4,479,848 A | 10/1984 | Otsubo et al. | |
| 4,491,499 A | 1/1985 | Jerde et al. ................. | 156/626 |
| 4,645,349 A | 2/1987 | Tabata ........................ | 356/382 |
| 4,664,522 A | 5/1987 | LeFebre ...................... | 356/328 |

(List continued on next page.)

FOREIGN PATENT DOCUMENTS

| | | |
|---|---|---|
| EP | 0416333 A1 | 3/1991 |
| EP | 0518467 A2 | 12/1992 |
| EP | 0653621 A1 | 5/1995 |
| EP | 0735565 A1 | 10/1996 |
| FR | 2718231 | 10/1995 |
| JP | 5961036 | 4/1984 |
| JP | 59139630 | 8/1984 |
| JP | 60-124942 A * | 7/1985 |
| JP | 61083904 | 4/1986 |
| JP | 6381929 | 4/1988 |
| JP | 0697151 | 4/1994 |

OTHER PUBLICATIONS

Breiland, W.G. and K.P. Killeen; "A virtual interface method for extracting growth rates and high temperature optical constants from thin semiconductor films using in situ normal incidence reflectance"; *Journal of Applied Physics;* vol. 78, No. 11; Dec. 1, 1995; pp. 6726–6736.

Zhou, Zhen–Hong and Rafael Reif; "Epi–Film Thickness Measurements Using Emission Fourier Transform Infrared Spectroscopy—Part II: Real–Time in Situ Process Monitoring and Control"; *IEEE Transactions on Semiconductor Manufacturing;* vol. 8, No. 3; Aug. 1995; pp. 340–345.

Zhou, Z.H., et al.; "Real–time in situ epitaxial film thickness monitoring and control using an emission Fourier transform infrared spectrometer"; *J. Vac. Sci. Technol.;* vol. 12, No. 4; Jul./Aug. 1994; pp. 1938–1942.

Monahan, Kevin M.; "Endpoint detection of photoresist development using multiple wavelengths and polarized light"; *SPIE Proceedings—Integrated Circuit Metrology, Inspection, and Process Control III;* vol. 1087; 1989; pp. 322–331.

Filmetrics Web Site; 1997; www.filmetrics.com.

*Primary Examiner*—Anita Alanko
(74) *Attorney, Agent, or Firm*—Skjerven Morrill MacPherson LLP

(57) ABSTRACT

A semiconductor process endpoint detection system uses a relatively wide wavelength range of light to reflect off a semiconductor wafer being processed. Relatively narrow wavelength ranges can be monitored within this wide reflected wavelength range in order to produce an endpoint of the process. An indication can be produced which is a function of detected light intensities at multiple wavelength ranges. These indications aid in the determination of an endpoint of a process.

12 Claims, 7 Drawing Sheets

U.S. PATENT DOCUMENTS

| | | | | |
|---|---|---|---|---|
| 4,695,700 A | | 9/1987 | Provence et al. | 219/212 PD |
| 4,767,495 A | * | 8/1988 | Nishioka | 216/60 |
| 4,851,311 A | | 7/1989 | Millis et al. | 430/30 |
| 4,984,894 A | | 1/1991 | Kondo | 356/382 |
| 4,988,198 A | | 1/1991 | Kondo | 356/357 |
| 5,045,149 A | | 9/1991 | Nulty | 156/627 |
| 5,066,603 A | * | 11/1991 | Bulat et al. | 437/29 |
| RE33,956 E | | 6/1992 | Lin et al. | 250/550 |
| 5,160,402 A | | 11/1992 | Cheng | 156/627 |
| 5,160,578 A | | 11/1992 | Robbins | 156/626 |
| 5,166,525 A | | 11/1992 | Rodgers et al. | 250/338.1 |
| 5,190,614 A | | 3/1993 | Leach et al. | 156/626 |
| 5,266,525 A | | 11/1993 | Morozumi | 437/195 |
| 5,308,414 A | | 5/1994 | O'Neill et al. | 156/626 |
| 5,322,590 A | | 6/1994 | Koshimizu | 156/626 |
| 5,362,969 A | | 11/1994 | Glenn | 250/561 |
| 5,376,231 A | * | 12/1994 | Matsumoto et al. | 438/754 |
| 5,405,488 A | | 4/1995 | Dimitrelis et al. | 156/627 |
| 5,450,205 A | | 9/1995 | Sawin et al. | 356/382 |
| 5,458,732 A | | 10/1995 | Butler et al. | 216/61 |
| 5,499,733 A | | 3/1996 | Litvak | 216/38 |
| 5,536,359 A | | 7/1996 | Kawada et al. | 156/626.1 |
| 5,565,114 A | | 10/1996 | Saito et al. | 216/60 |
| 5,576,629 A | | 11/1996 | Turner et al. | 324/709 |
| 5,642,196 A | | 6/1997 | Alves et al. | 356/381 |
| 5,710,069 A | * | 1/1998 | Farkas et al. | 216/85 |
| 5,872,633 A | * | 2/1999 | Holzapfel et al. | 356/381 |
| 5,942,449 A | * | 8/1999 | Meikle | 216/88 |
| 5,985,679 A | * | 11/1999 | Berman | 438/7 |
| 6,074,568 A | * | 6/2000 | Adachi et al. | 216/60 |

* cited by examiner

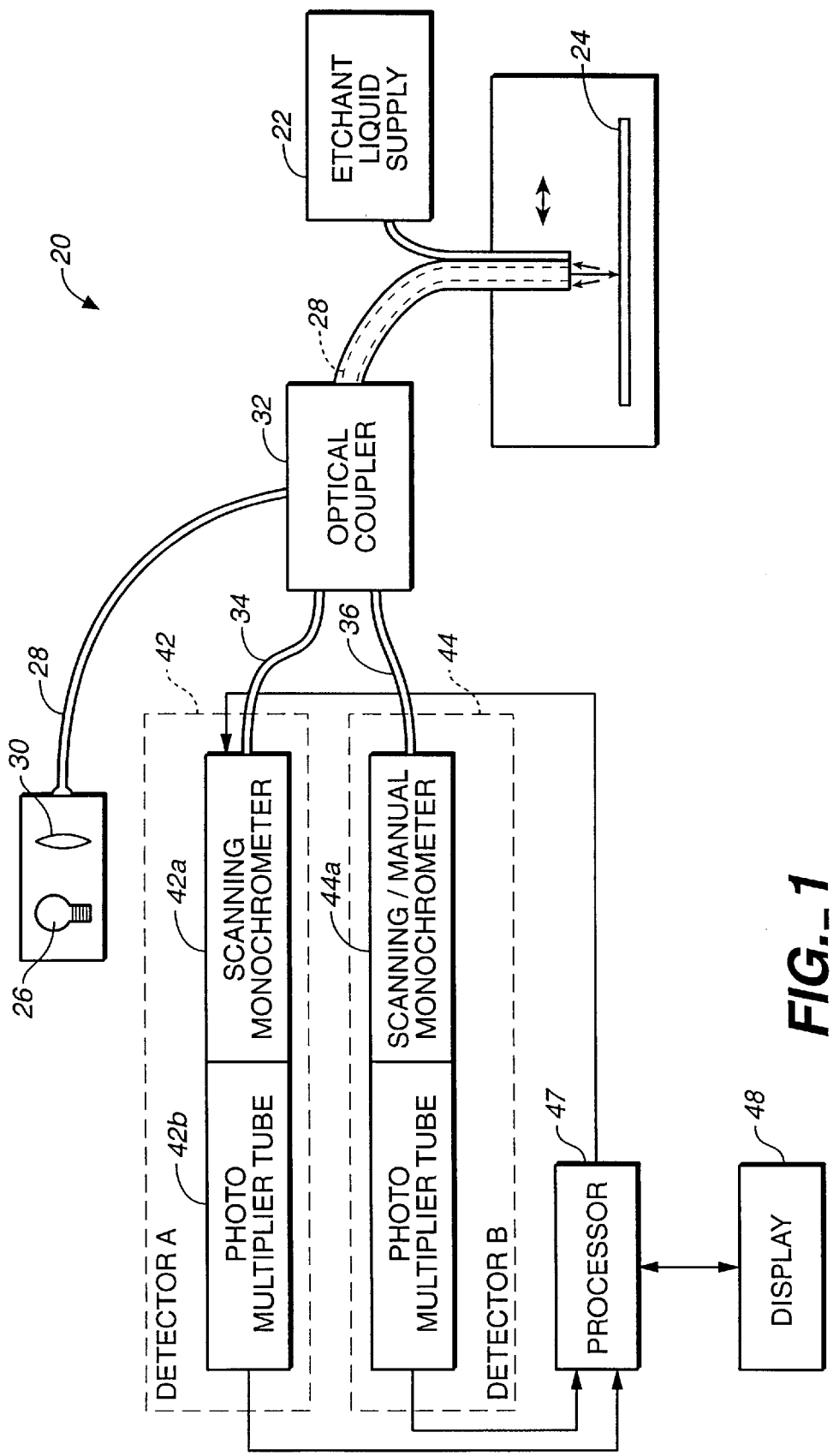
FIG._1

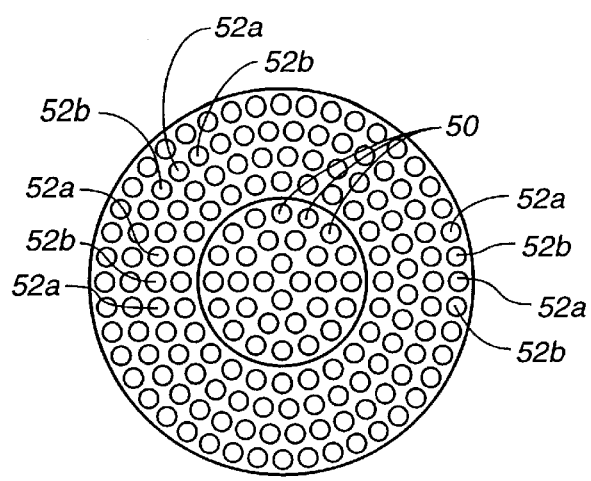
FIG._2A
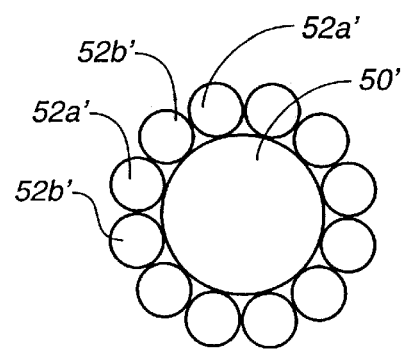
FIG._2B
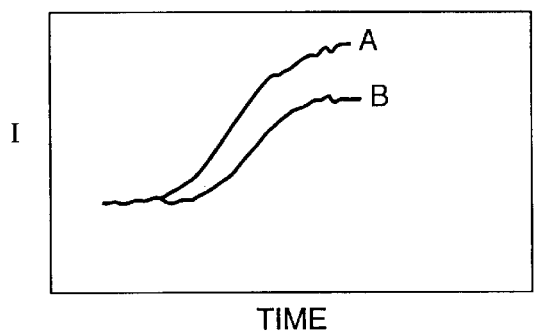
FIG._4A
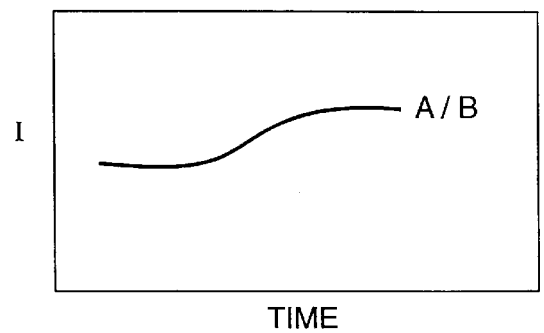
FIG._4B

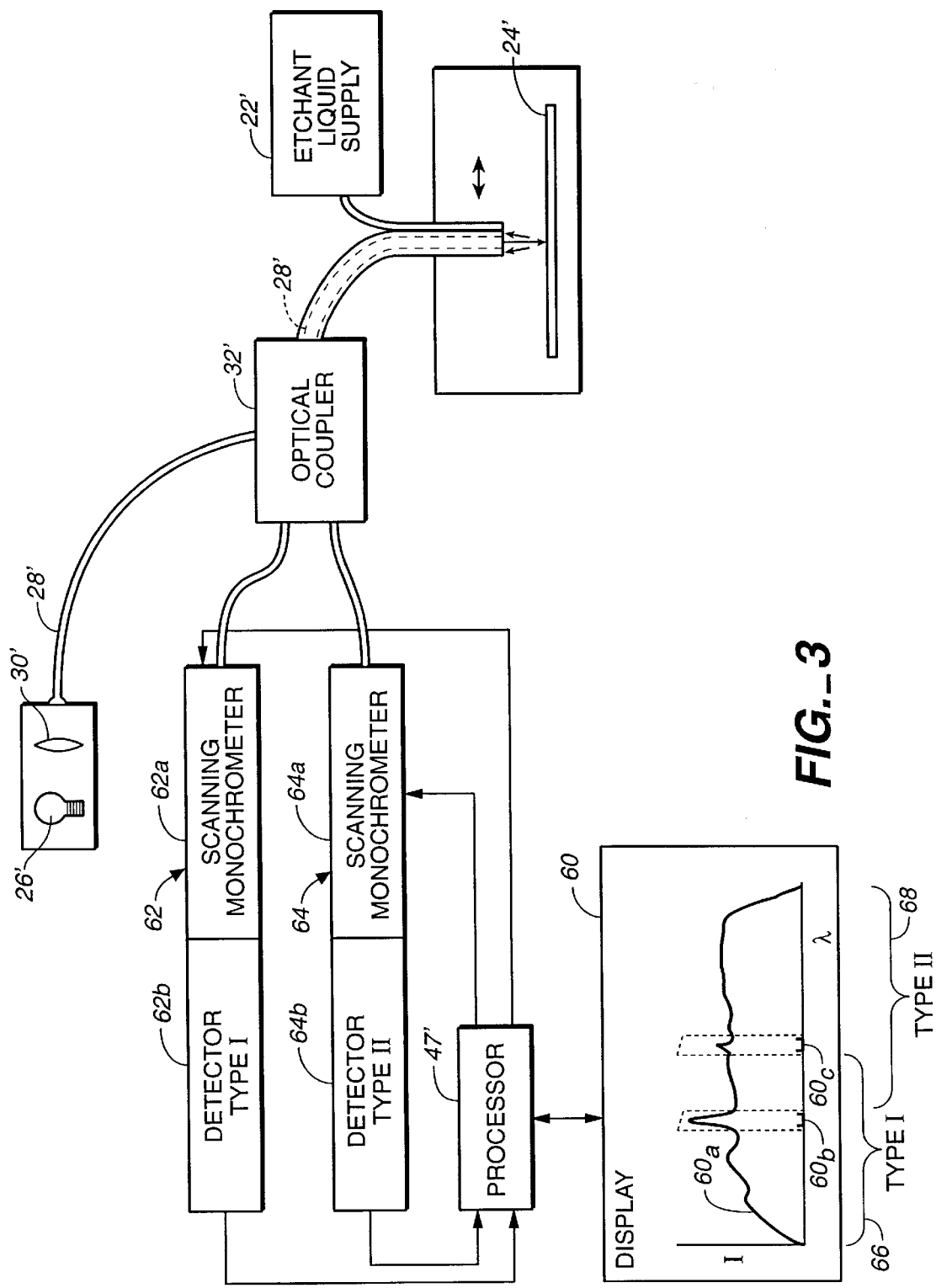
FIG._3

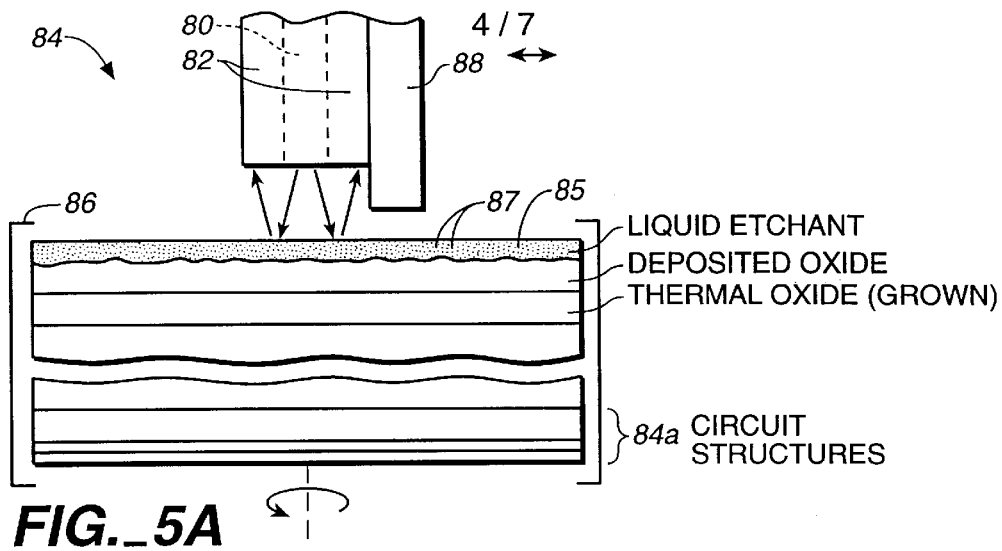
FIG._5A
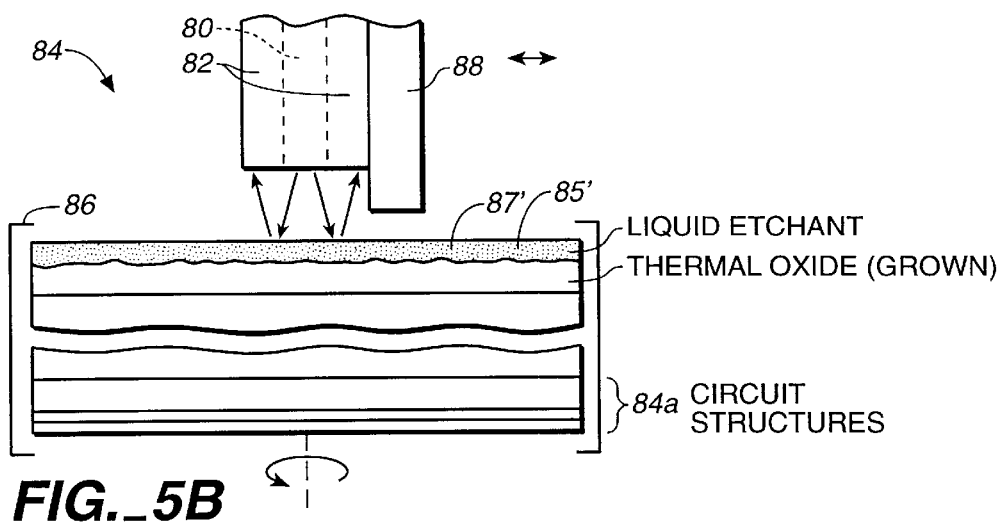
FIG._5B
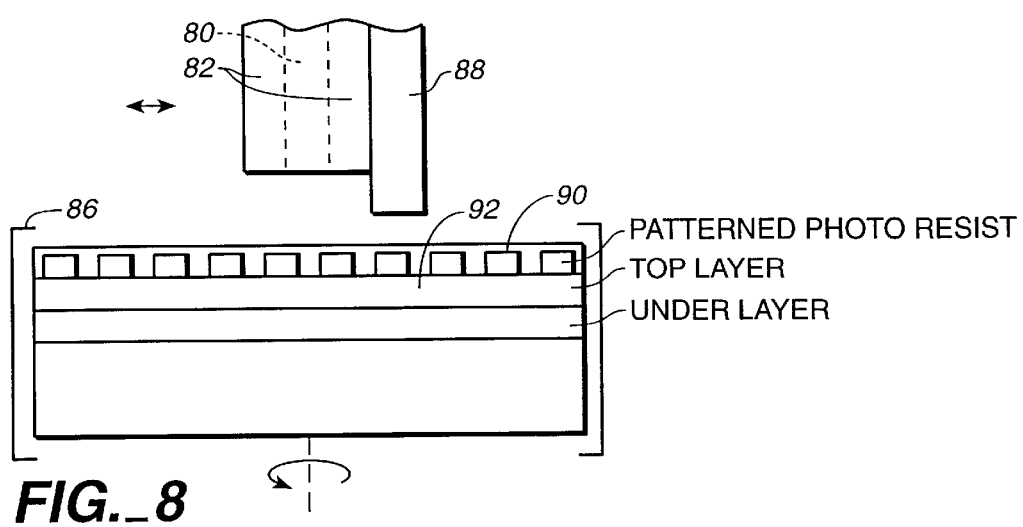
FIG._8

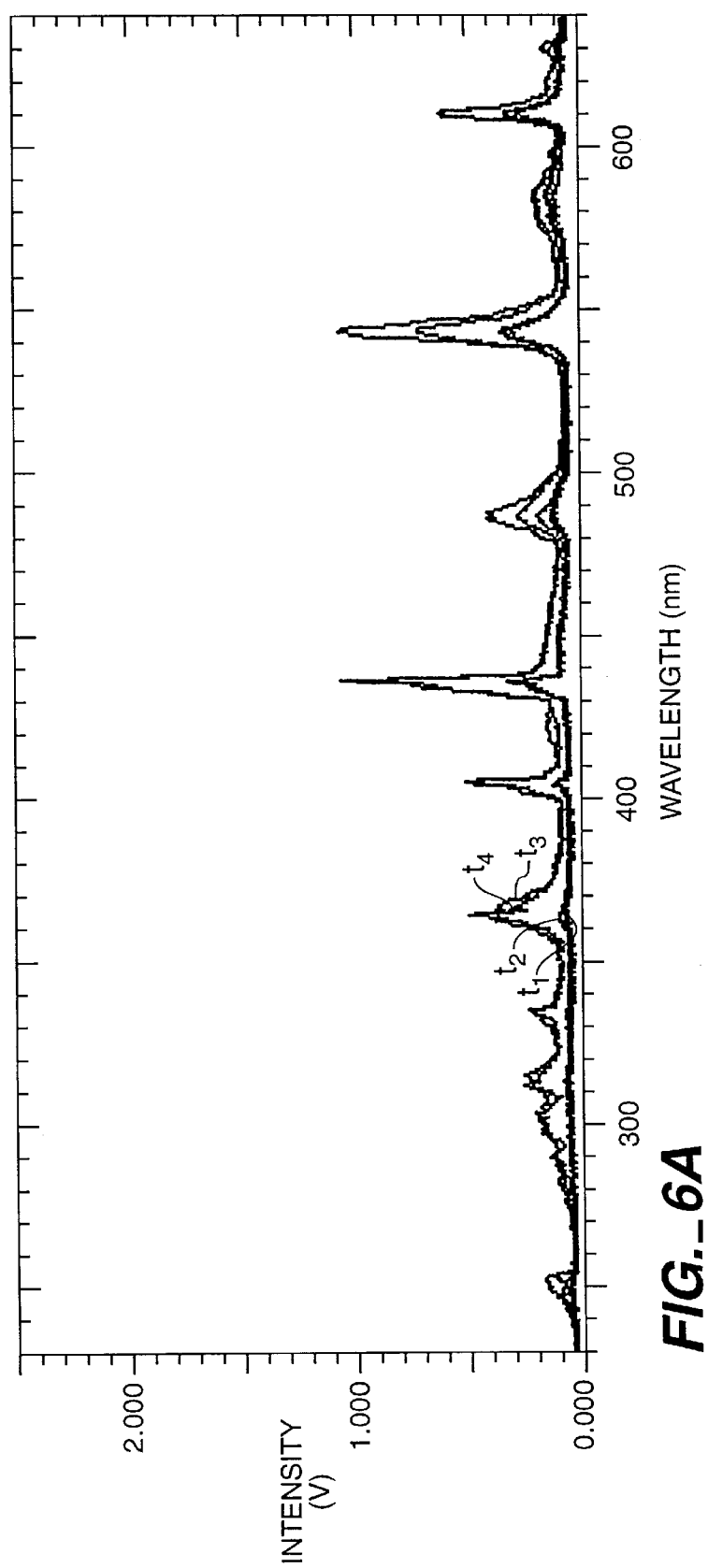
FIG._6A

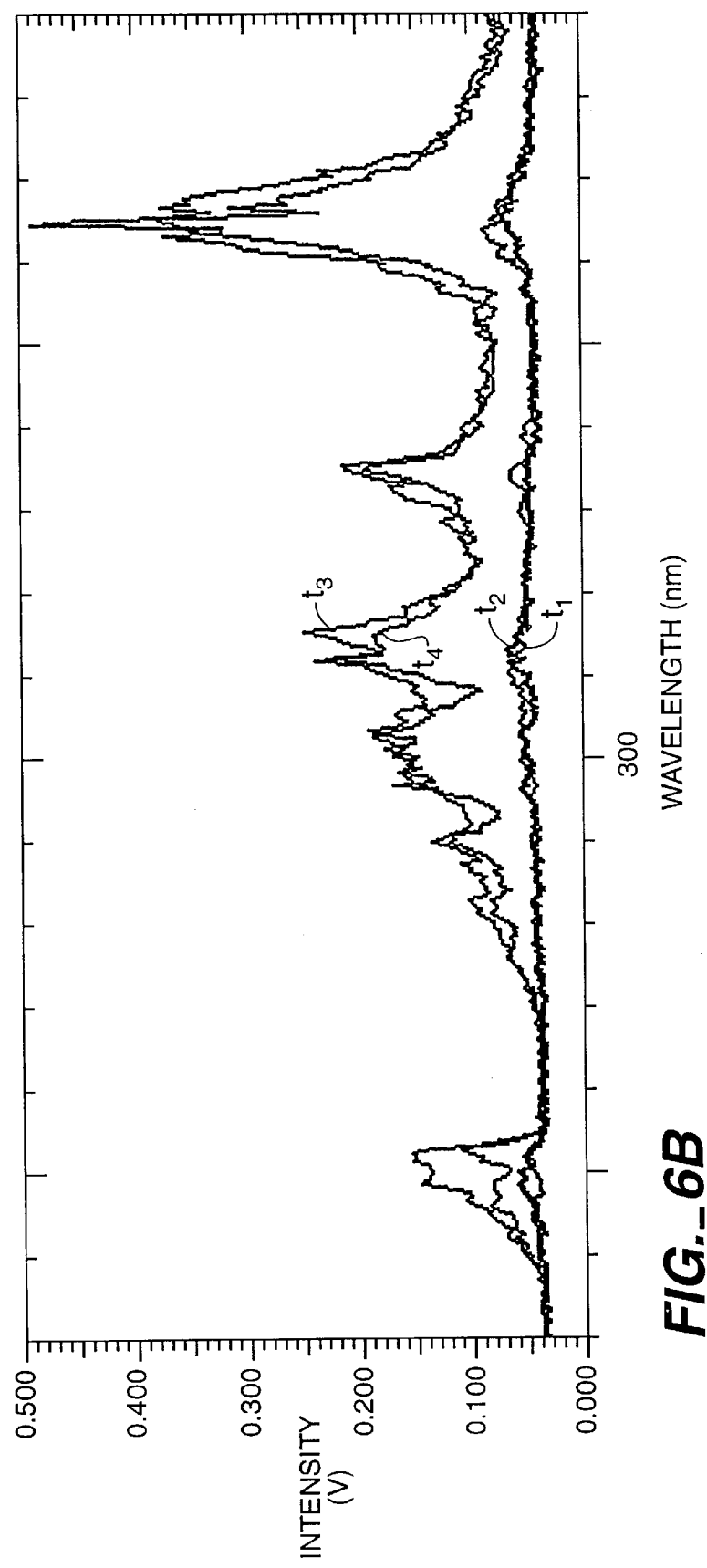
FIG._6B

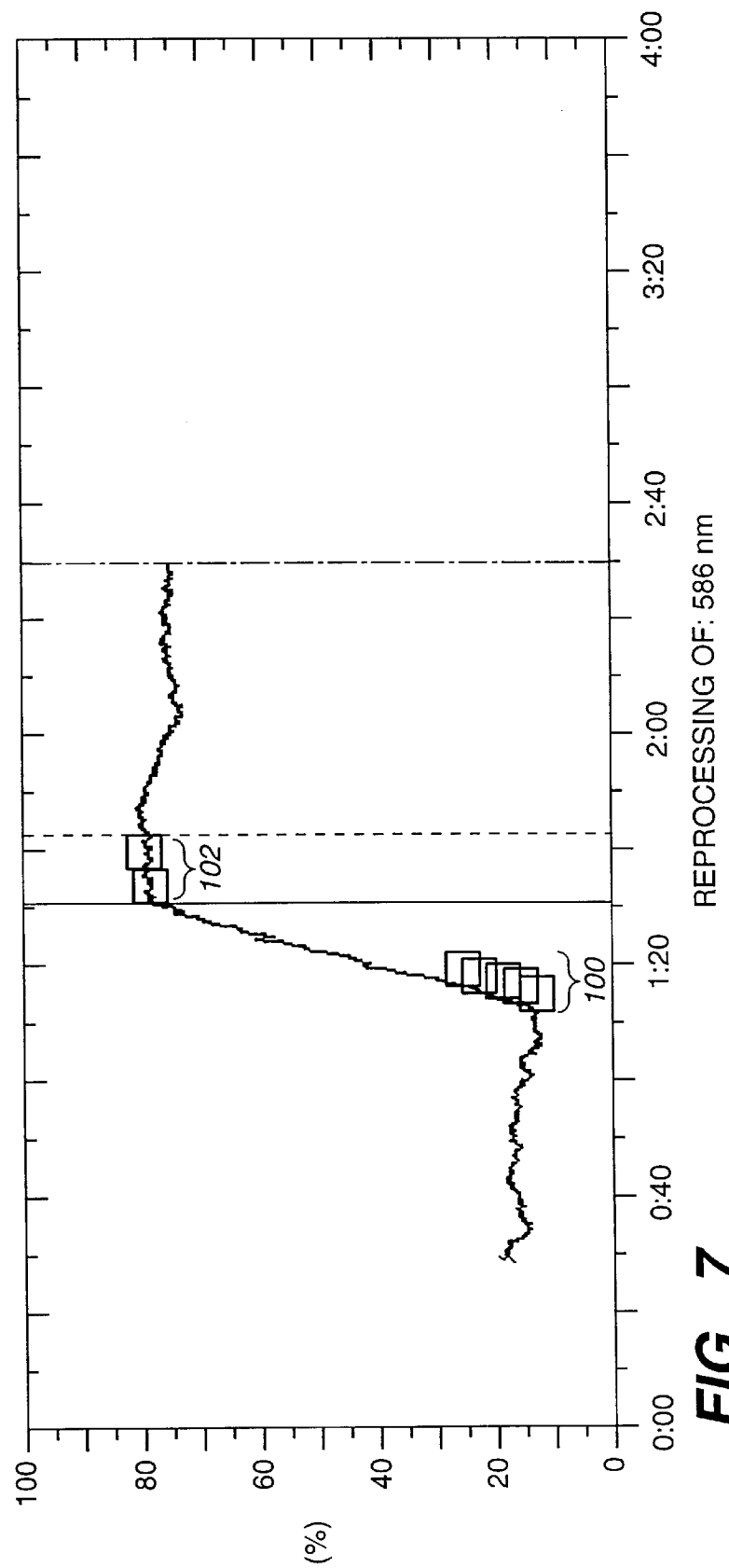
FIG._7

LIQUID ETCH ENDPOINT DETECTION AND PROCESS METROLOGY

BACKGROUND OF THE INVENTION

The present invention relates to semiconductor process endpoint systems. Endpoint systems determine the completion of a semiconductor process so that the semiconductor process can be halted.

Plasma etching endpoint systems detect and analyze light emitted from the formed plasma. As the etching step is completed, the composition of the emitted light from the plasma changes. These changes can be used to detect the endpoint of the plasma etch. Examples of such plasma etch endpoint systems include Koshimizu U.S. Pat. No. 5,322,590; O'Neill U.S. Pat. No. 5,308,414; and Dimitrelis U.S. Pat. No. 5,405,488.

Another type of etch is a "liquid" or "wet" etch. In a wet etch, a liquid etchant is placed on a wafer to etch away unwanted material, such as in a patterning step. Because wet etching systems do not use a plasma, no emitted light is produced that could be used to determine an endpoint.

One type of endpoint detection for an etch of a thin layer is an interferometric technique. When an etched layer has a index of refraction that is significantly different from an underlayer, the total reflectance is highly dependent on the thickness of the top layer as a function of wavelength.

For a given wavelength, some top layer thicknesses produce constructive interference of reflected light and some top layer thicknesses cause destructive interference of reflected light. A rainbow-colored oil slick on a puddle is a everyday illustration of a similar effect. Areas of oil with different thicknesses preferably reflect different wavelengths.

For single wavelength interferometry, typically, only a narrow wavelength range of light is reflected off of the substrate. As the top layer is etched away, the change in the top layer thickness causes oscillations in the graph of detected intensity versus time. When the top layer is removed, the detected oscillations end.

A disadvantage of the interferometric method is that a significant difference between the index of refraction of the etched layer and the index of refraction of the underlayer is required to obtain a good signal-to-noise ratio. For this reason, this method is inappropriate for use with many wet etch processes. For example, a deposited silicon dioxide layer has an index of refraction that is within one percent of the index of refraction of a thermally-grown silicon dioxide layer. The oscillations in the reflected light intensity for an etch of deposited silicon dioxide over grown silicon dioxide would be undetectable due to noise caused by environmental and process fluctuations. Intense background lighting is an example of an environmental fluctuation. Process fluctuations can include wafer chuck rotation, oscillations of the chemical dispenser, and non-uniform etching rates.

For the above reasons, it is desired to have an improved system for monitoring the endpoint of semiconductor process.

SUMMARY OF THE INVENTION

In one embodiment of the present invention, the endpoint of a semiconductor process is detected by identifying a sudden slope change in an intensity indication produced using light reflected off of a semiconductor wafer. The detection of a slope change does not require a top layer to have a different index of refraction from the underlayer. For example, for an etch of deposited silicon dioxide over thermally grown silicon dioxide, it has been found that the intensity of detected light reflected off of a wafer has a slope change near the endpoint.

In another embodiment of the present invention, light over a relatively wide range of wavelengths is reflected off of a wafer surface during a semiconductor process. Reflecting a relatively wide range of wavelengths off of a wafer to determine the endpoint has a number of advantages. First, this allows for two or more detectors to monitor two or more different wavelength ranges of reflected light. Monitoring light in two or more different ranges allows for an indication to be produced which is a function of multiple reflected light intensities. For example, the detected light intensity for a first wavelength range may have a different rate of change than a detected intensity for a second wavelength range as the top layer is etched away. An indication which is a ratio of the second intensity value over the first intensity value can remove some of the process noise and variability and produce a steeper slope function to give a better indication of the endpoint than either of the two intensities alone.

Since the light source produces a wide range of wavelengths, the system can provide the user with flexibility in selecting desired wavelength ranges to monitor during the process. The system of the present invention allows the selection of wavelength ranges that are particularly material dependent and thus repeatable for a given process.

The detected intensity of reflected light of a wafer material forms a repeatable "fingerprint" of the material. Further, the material's "fingerprints" can be used as a baseline to determine information concerning the process.

The prior art use of a narrow bandpass filter to filter the light from the light source restricts the wavelengths of light reflected off the wafer to a narrow range and thus prevents some advantages of the present invention. The light source that produces a wide range of wavelengths need not be a broadband light source. In fact, a preferred embodiment of the present invention uses a light source, such as a tungsten/mercury light bulb, that produces multiple emission peaks over the relatively wide wavelength range. The reflections off of the wafer at these emission peaks produces a more pronounced change in signal.

In one embodiment of the present invention, the change in the detected intensity of the reflected light versus time is the result of a change in the composition of the liquid etchant. While a top layer is being etched, substances such as products and by-products of the etch are added to the liquid etchant. These substances can affect the detected intensity of reflected light. Once the endpoint of the process occurs, these substances are not introduced into the liquid etchant at such a high rate and the composition of the etchant changes. Thus, the endpoint of the etch can be determined from a change in the detected intensity of reflected light. This effect can be used for etches in which the top layer has a similar index of refraction as the underlayer.

In another embodiment of the present invention, the change in the detected intensity of the reflected light versus time is the result of a different surface roughness or porosity of the etched layer compared to the underlayer. A rough surface will reflect light differently than a smooth surface. For this reason, the endpoint of the etch can be determined from a change in the detected intensity of reflected light even when the top layer has a similar index of refraction as the underlayer.

Another embodiment of the present invention involves the arrangement of the optical fibers. In a preferred embodiment, optical fiber(s) operably connected to the light source are surrounded by optical fibers operatively connected to the detectors. This allows for an efficient detection of light. For light incident straight down on a flat surface, the highest level of reflections tend to be near the source optical fibers. Arranging the detector optical fibers about the source optical fiber(s) allows for an efficiently detected signal. A preferred embodiment of the present invention arranges the detector optical fibers in a ring around the source optical fibers. If more than one detector is used, the detector optical fibers for each detector are preferably arranged relatively evenly about the ring for an even pickup of light from the same wafer surface area.

An additional embodiment of the present invention involves the use of multiple different types of detectors. Each type of detector can have a different operating wavelength range. A display of detected light intensity over the combined wavelength range can then be produced. The user can select wavelengths within the combined wavelength range for monitoring during the semiconductor process.

Another embodiment of the present invention concerns the detection of an endpoint of an etch of a deposited dielectric, such as a silicon dioxide layer formed in a chemical vapor deposition using tetra-ethyl-ortho-silicate (TEOS) over a grown dielectric such as a thermally-grown silicon dioxide. The endpoint of this etch cannot be accurately determined by an interferometric system. As discussed above, the index of refraction of a deposited silicon oxide is within one percent of the index of refraction of the grown silicon dioxide. By reflecting a wide range of wavelengths off of the wafer, it was found that the reflections at certain wavelengths are highly dependent on the process completion. For example, there are significant reflected light intensity changes at narrow wavelength range about 586 nm. A display of wavelength versus detected intensity before and after an etch allows for useful wavelength ranges to be found and selected by the user. These wavelength ranges can be monitored during the semiconductor process to determine an endpoint.

An etch of a silicon nitride layer over a deposited or thermally-grown oxide is another etch where the top layer has an index of refraction similar to the underlayer. The system of the present invention is particularly valuable to detect an endpoint of that etch as well.

Still another embodiment of the present invention concerns the detection of an endpoint of an etch of anti-reflective aluminum. Anti-reflective aluminum is typically positioned over polysilicon, or dielectric layer. Because of the lack of reflections from the anti-reflective aluminum, it is hard to detect an endpoint for such an etch. In the present invention, since a wide range of wavelengths are reflected off of the wafer, the user can select those wavelength ranges that are affected by the removal of such a layer.

BRIEF DESCRIPTION OF THE DRAWINGS

The above and other features and aspects of the present invention will become more apparent upon reading the following detailed description in conjunction with the accompanying drawings, in which:

FIG. 1 is a diagram of a wet etch endpoint detector system of the present invention;

FIG. 2A is a cross-section of an optical fiber bundle used with the present invention;

FIG. 2B is a cross-section of an alternate embodiment of an optical fiber bundle used with the present invention;

FIG. 3 is a diagram of an alternate endpoint detector system of the present invention;

FIG. 4A is an illustration showing the intensity of a wavelength range A and B versus time;

FIG. 4B shows the intensity of a ratio A over B versus time;

FIG. 5A is a diagram of an embodiment of the endpoint detector of the present invention showing the beginning of an etch of a deposited dielectric;

FIG. 5B is a diagram of an embodiment of the endpoint detector of the present invention showing the end of an etch of a deposited dielectric;

FIG. 6A is a graph showing the intensity of the reflected light before and after an etch of deposited silicon dioxide over grown silicon dioxide;

FIG. 6B is an expansion of FIG. 6A in a wavelength range from 230 nm to 390 nm;

FIG. 7 is a graph illustrating reflected intensity versus time for reflections at a narrow wavelength range about 586 nm for the etch of FIG. 6A; and FIG. 8 is a diagram of an embodiment of the endpoint detector of the present invention showing a patterned etch.

DETAILED DESCRIPTION OF THE PREFERRED EMBODIMENT

FIG. 1 is a diagram of an endpoint detection system of the present invention. This system 20 can be used with a known wet etch system. Etching liquid supply 22 supplies liquid etchant to a semiconductor wafer 24. The wafer 24 is rotated so that the etchant liquid evenly distributes over the surface. In a preferred embodiment, the dispenser oscillates along a radius of the wafer 24.

The endpoint detection system 20 uses a light source 26. The light source 26 can be a tungsten/mercury light bulb. The tungsten/mercury light bulb 26 supplies light over a relatively wide range of wavelengths. The tungsten/mercury light bulb has a number of emission peaks over the relatively wide range. As is discussed below, reflections at some of the emission peaks can give information about the endpoint of semiconductor processes. Multiple light sources each having a characteristic set of emission peaks could be used. This produces more possible wavelengths of interest.

An optical element 30 can be used to couple the light source to the optical fibers 28. In a preferred embodiment, the light source produces light over a range of 100 to 1,500 nanometers. In a more preferred embodiment, the light source produces light over the range of 200 to 800 nanometers.

The light from the light source 26 is sent through the optical fiber bundle 28 to reflect off the wafer 24. The reflected light is transmitted through optical fibers surrounding the bundle 28. The optical coupler 32 distributes the detected light to detectors 42 and 44 through bundles 34 and 36.

FIG. 2A is an illustration of the cross-section of the bundle of optical fibers in a preferred embodiment. In the center, one or more fiber(s) 50 are used to transmit the light to the wafer. The fibers in the outer ring are evenly distributed between fibers 52a connected to the first detector and fibers 52b connected to the second detector. For this reason, the reflected light sent to each detector comes from the same wafer surface area illuminated by the source fiber(s) 50. The optical coupler 32 shown in FIG. 2 distributes the bundles to the correct detector.

FIG. 2B is an illustration of a cross-section of a bundle of optical fibers in an alternate embodiment. In this alternate embodiment, a single source optical fiber 50' is surrounded by fibers 52*a*' connected to the first detector and fibers 52*b*' connected to the second detector.

FIG. 1 shows the light beam directed straight down at the wafer 24. It is possible to direct polarized light to the wafer at an angle; the polarized light would produce high back-reflections to the detector portion of the bundle.

FIG. 1 shows two detectors 42 and 44. In a preferred embodiment, detector 42 comprises a photo-multiplier tube 42*b* along with a monochrometer 42*a*. In a preferred embodiment, the photo-multiplier tube is a Hathamathu. The scanning monochrometer is preferably an ISA. In a preferred embodiment, at least one of the monochrometers is a scanning monochrometer.

A monochrometer directs a selected wavelength range of reflected light to the photomultiplying tube. The detector can thus produce an indication of the reflected light intensity at a given wavelength.

When the monochrometer is scanned, a display of the intensity of the reflected light versus wavelength can be produced. The user can determine from the display of wavelength versus reflected light intensity the wavelength range or ranges be monitored during the semiconductor process. The processor can then set the scanning monochrometer 42*a* to the desired range. The other monochrometer 44*a* can be a manual or scanning monochrometer. A manual monochrometer is set by hand to the desired wavelength range. By using two detectors, two different wavelength ranges can be monitored.

The processor 47 is, in a preferred embodiment, a Luxtron 1015DS Endpoint Process Controller or an Optima 9100 Endpoint Process Controller available from the Luxtron Corporation. Alternately, the processor 47 can be a programmed microprocessor. The processor 47 controls the display 48. The processor 47 can also use the intensity indications to determine the endpoint of the semiconductor process. Once the endpoint is determined, the processor 47 can control the system to halt the processing step.

Display 48 can show graphs of the reflected light intensity versus time and reflected light intensity versus wavelength.

FIG. 3 is a diagram of an alternate embodiment of the endpoint detection system of the present invention. Curve 60*a* on display 60 shows the reflected light intensity versus wavelength. Different individual wavelength ranges 60*b* and 60*c* can be selected. These wavelength ranges can be manually or automatically set to be monitored during the semiconductor processing step.

In the embodiment of FIG. 3, two different types of detector 62*b* and 64*b* are used. The two different type of detectors have different operating ranges. The type I detector has a first operating range 66, and the type II detector has a second operating range 68. By using the two different types of detectors with two different detector ranges, a display of the reflected light intensity over a combined wavelength range can be produced. The two different type of detectors may be photo-multiplier tubes having different operating ranges. Alternately, one or more other types of detectors rather than photo-multiplier tubes can be used.

Display 60 shows a graph of the detected light intensity versus wavelength. A display of detected light intensity versus frequency or any other wavelength indication can also be produced. For purposes of this disclosure, a wavelength indication will be defined as including wavelength, frequency, or any other function of the wavelength.

FIGS. 4A and 4B illustrate the endpoint detection concept. FIG. 4A is a diagram that shows the reflected intensity versus time for wavelength ranges A and B. Wavelength range A could correspond to range 60*b* and wavelength range B could correspond to range 60*c* in FIG. 3. The detected light intensity in wavelength range A rises at a greater rate than the detected light intensity in wavelength range B during the semiconductor process. The detected signals A and B may include external noise and process variability that can be reduced by forming the ratio A/B as the monitored intensity indication. Note that the function A/B is a scalar value. Each of the functions used for endpoint detection can be adjusted so that the initial value is at a fixed initial value. It has been found that ratio and multiples such as A/B, AB, AB/C, etc. produce a good endpoint detection indication.

A relatively wide wavelength range light source allows multiple wavelengths to be monitored. This allows combined functions of intensities at different wavelengths to be produced. These functions allow for improved endpoint detection as described above. Such combined functions could not be produced if only a relatively narrow wavelength range were reflected off the wafer.

FIG. 5 illustrates an embodiment of the present invention. As shown in this embodiment, the light comes through fiber bundle 80, and reflects off the wafer 84 back to bundles in area 82. The wafer 84 is rotated using a holder 86. The liquid etch material is supplied through tube 88 to form a layer 85. In one embodiment, the liquid etchant is about 200 times more selective for the deposited oxide than the grown oxide. One embodiment of the present invention determines the endpoint of an etch of materials formed on the back side of a wafer. Circuit structures 84*a* are formed on the front side of the wafer, but the processing steps used to form these structures can form layers such as oxides on the back side of the wafer. In one semiconductor etching step, it is desired to remove a deposited oxide layer without removing a thermally-grown oxide layer. Detecting the transition between the deposited oxide and the grown oxide is relatively difficult because these oxides have similar index of refractions. By using a light source to supply light over a wide wavelength range to reflect off of the wafer surface, it was found that the deposited oxide and the thermally-grown oxide have different reflectivity signatures.

It is currently believed that the deposited dielectric has a different surface roughness than the thermally-grown dielectric layer. The roughness of the exposed deposited oxide shown in FIG. 5A is believed to be greater than the roughness of the exposed thermally-grown oxide layer shown in FIG. 5B. This can affect the detected intensity of reflected light as the process proceeds. A rough surface tends to scatter light more than a smooth surface. Depending on the orientation of the source fiber and the detector fiber, the detected intensity of reflected light may be greater for a smooth surface or a rough surface.

While the deposited oxide is being etched away, products and by-products of the etch are present in the liquid etchant layer. It is currently believed that these substances 87 can change the detected intensity of reflected light. As shown in FIG. 5B, when the endpoint is reached, the amount of the substances 87' in the liquid is drastically reduced.

FIG. 6A is a graph showing the intensity of reflected light before and after an etch of deposited silicon dioxide over a grown silicon dioxide. The graph was produced by scanning a monochrometer from 230 nm to 640 nm and reading the voltage output of a corresponding photo-multiplier tube. Two scans $t_1$ and $t_2$ were done of a deposited oxide before the endpoint was reached; two other scans $t_3$ and $t_4$ were done of a thermal grown oxide after the endpoint was reached. Note that a number of the peaks vary in the reflected light intensity before and after the endpoint is reached. The similarity of graphs $t_1$ with $t_2$ and graphs $t_3$ with $t_4$ indicates the repeatability of the reflectivity profiles. FIG. 6B is an expansion of FIG. 6A in a wavelength range from 230 nm to 390 nm.

FIG. 7 is a graph illustrating reflected intensity versus time for reflections at a narrow wavelength range about 586 nm for the etch of FIG. 6A. A monochrometer is arranged at 586 nm. The output of the photo-multiplier is filtered via averaging to remove some of the variability. Note that the detected intensity rises as the semiconductor process proceeds. This may be because the thermally-grown oxide is smoother than the deposited oxide or as a result of the reduction of the level of products and by-products of the etch in the liquid etchant as the etch is completed.

The curve of FIGS. 7 can be used to determine an endpoint of the etch process. For example, the endpoint can be determined by analyzing the rate of change of the intensity indication. Multiple intensities can be used in a combined intensity indication to be analyzed.

In a preferred embodiment, a windowing technique is used. In the windowing technique, a graphical window of variable dimensions is positioned on the display. Each graphical window is positioned so that the center of the left face is at the point that the curve leaves the prior window. At one area 100 of the curve, the slope of the curve will be such that the curve will leave through the top or bottom of the window. At another area 102 of the curve, the slope of the curve will be such that the curve will pass out the right side of the window. The endpoint can be defined as a point that the curve passes left-to-right through a predetermined number of windows.

The reflected light intensity curve depends upon the wavelength being monitored. The best wavelength ranges to monitor for each process can be determined by experimentation. If two wavelength ranges are monitored at the same time, the wavelength ranges need not be on different peaks. The wavelength range of the monochrometer is narrow enough that two ranges could be monitored about the same reflectivity peak. This technique may be used to avoid drift effects.

Note that one advantage of the invention of FIGS. 1 and 3 is that the system can be used for different wet etching steps in the same etcher. Different wavelengths can be monitored by the system during these different processing steps in order to determine an endpoint for each of the processing steps. Different wavelength ranges give better information as to the endpoint for different wet etches.

The method of the present invention can also be used to determine the endpoint of an etch of anti-reflective aluminum. Because of the low reflectivity of the anti-reflective aluminum, it is difficult to detect the endpoint of an etch of this substance. By using a wide range of incident light, the best wavelength ranges can be found for monitoring.

FIG. 8 is a diagram of an embodiment of the endpoint detector of the present invention showing a patterned etch. In the patterned etch, a patterned photoresist layer 90 is positioned on the top layer 92. A liquid etchant is placed on the wafer to selectively etch the top layer 92 down to the underlayer 94. The detected light intensity for this embodiment will tend to be some combination of the intensity "signatures" for the materials of the photoresist, the top layer, and the underlayer. Since the amount of photoresist will remain relatively constant, a change in the detected intensity may result from a change in the exposed surface areas of the top layer versus the underlayer. Since, in a preferred embodiment, the dispenser and fiber assembly oscillates along a radius of the wafer, for different assembly positions different rings of the wafer are illuminated. An averaging of the detected light intensity over the period of the assembly oscillation may avoid problems due to an uneven photoresist pattern.

The system of the present invention can also be used to find an endpoint to other semiconductor processes. For example, the present invention could be used to determine an endpoint of a photo-lithography development step. The photo-resist is exposed with ultra-violet light. In the development step, a wide wavelength range light source that avoids the ultra-violet region can reflect off of the wafer to indicate the development of the photo-resist. For example, the light source may range from 550 nm to 1000 nm. The system of the present invention can also be used with a planarization step.

The system of the present invention can be used to determine a state of the processing step other than an endpoint. For example, the present invention can produce a rough estimate of the level of exposed underlayer and thus act as a metrology tool.

Various details of the implementation and method are merely illustrative of the invention. It will be understood that various changes in such details may be within the scope of the invention, which is to be limited only by the appended claims.

What is claimed is:

1. A method comprising:

producing light with a light source;

reflecting light from the light source off of a semiconductor wafer;

detecting light reflected off of the semiconductor wafer during a wet etch of a deposited dielectric over a grown dielectric; and determining the endpoint of the semiconductor process using an intensity indication, where the intensity indication is produced from the combination of two or more discrete signals obtained from two or more different wavelength ranges.

2. The method of claim 1, wherein the wet etch is a wet etch of a deposited silicon oxide over a grown silicon oxide.

3. The method of claim 1, further comprising producing a displayed graph of a wavelength indication versus detected intensity.

4. The method of claim 3, further comprising selecting from the display at least one wavelength range of interest to detect during the wet etch.

5. A method of monitoring a material removal process, comprising:

providing a semiconductor wafer including a top layer of a first structure and an underlayer of another structure;

removing material from the top layer;

producing light with a light source;

reflecting light from the light source off of the wafer;

detecting light reflected off of the semiconductor wafer; and determining the endpoint of the material removal process using an intensity indication produced from the detected light as a result of the underlayer having a different surface roughness when exposed than the top layer.

6. A method, comprising:

producing light with a light source;

reflecting light from the light source off of a semiconductor wafer;

detecting light reflected off of the semiconductor wafer during a wet etch of an anti-reflective aluminum; and determining the endpoint of the semiconductor process using an intensity indication produced from the detected light, wherein the intensity indication is produced from the combination of two or more discrete signals obtained from two or more different wavelength ranges.

7. A method, comprising:

placing a liquid etchant on a semiconductor wafer to etch a wafer layer, the liquid etchant reacting with the wafer layer forming substances in the liquid etchant;

producing light with a light source;

reflecting light from the light source through the liquid and off of the wafer, at least some of the reflected light being altered by substances in the liquid etchant;

detecting light reflected off of the semiconductor wafer; and determining the endpoint of the semiconductor process using an intensity indication produced from the detected light, the intensity indication changing as a result of the amount of the substances formed in the liquid etchant near the endpoint, wherein the intensity indication is produced from the combination of two or more discrete signals obtained from two or more different wavelength ranges.

8. A method, comprising:

providing a semiconductor wafer including a top layer of a first structure and an underlayer of another structure;

producing light with a light source;

reflecting light from the light source off of the wafer;

detecting light reflected off of the semiconductor wafer; and determining the endpoint of the semiconductor process using an intensity indication produced from the detected light, the intensity indication changing as a result of the exposure of the underlayer, the exposed underlayer having a different surface roughness when exposed than the top layer, wherein the intensity indication is produced from the combination of two or more discrete signals obtained from two or more different wavelength ranges.

9. A method of monitoring removal of a layer of material that is being carried by a substrate, comprising:

directing light onto the layer in a manner to be reflected therefrom, detecting the reflected light as the layer of material is being removed, and determining when the magnitude of the detected reflected light changes as a result of exposure of a structure under the layer of material that has a different surface roughness than does the layer being removed.

10. The method of claim 9, wherein the substrate is a semiconductor wafer.

11. The method of claim 9, wherein the determination of when the magnitude of detected reflected light changes provides an indication of an endpoint of material removal.

12. The method of claim 9, wherein the layer of material being removed includes deposited silicon oxide and the structure under this layer includes thermally grown oxide.

* * * * *